Patented June 9, 1931

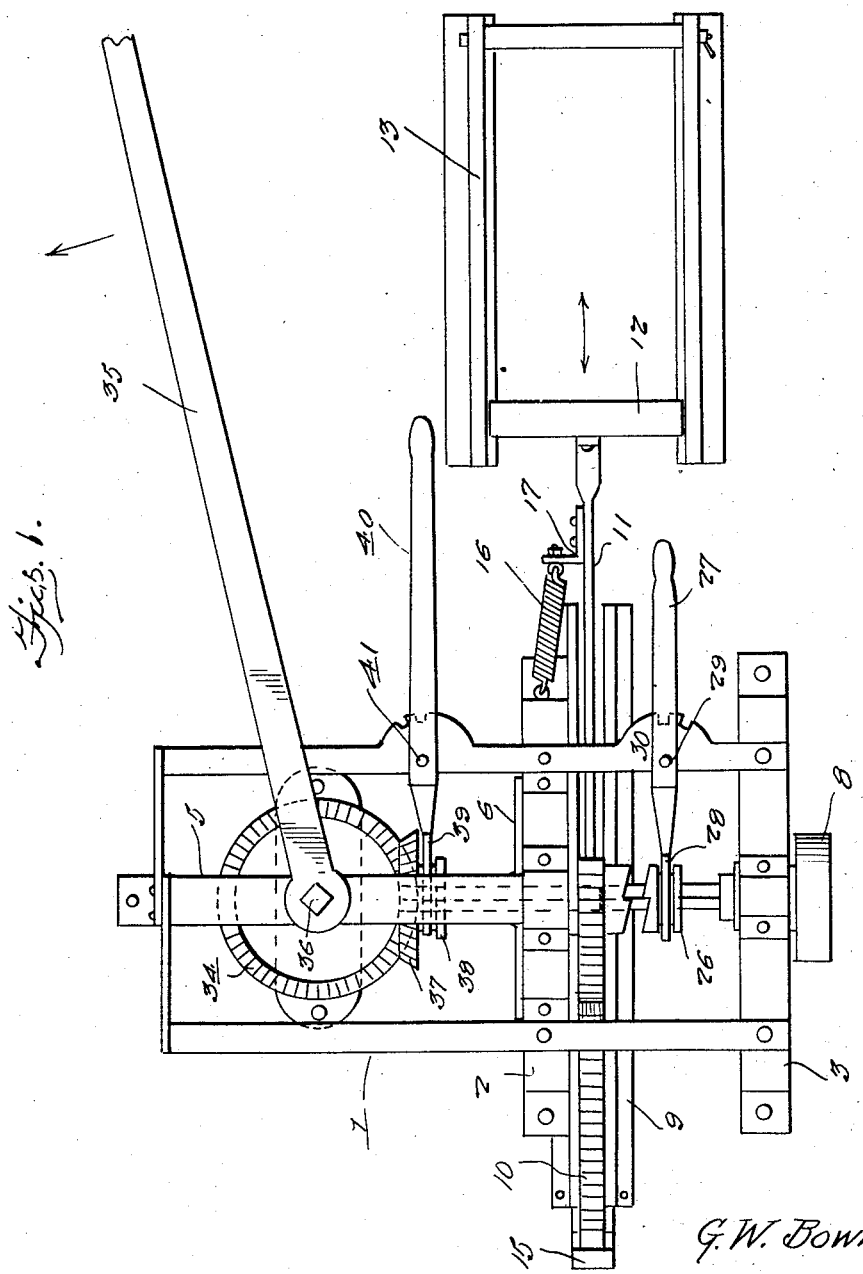

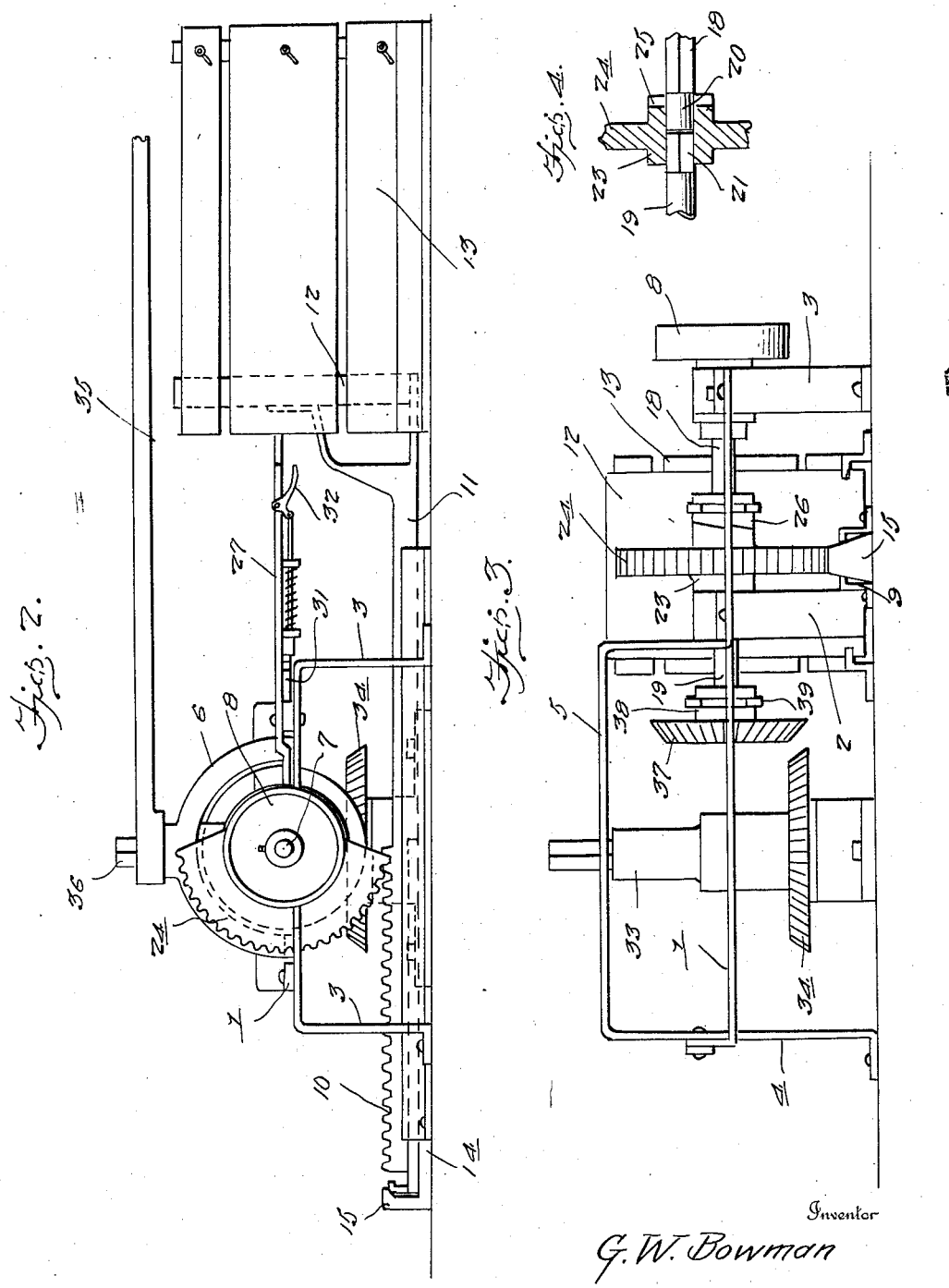

1,808,832

UNITED STATES PATENT OFFICE

GEORGE W. BOWMAN, OF SEYMOUR, TEXAS

HAY PRESS

Application filed October 29, 1928. Serial No. 315,795.

The present invention relates to presses such as hay presses, and has reference more specifically to the operating mechanism for the plunger of such press.

One of the important objects of the present invention is to provide an improved means employing essentially a rack bar and cooperating pinion for effecting the operation of the plunger in a positive and efficient manner.

A further object is to provide a hay press of the above mentioned character that can be actuated either by horse power or motor power, suitable clutch mechanism being provided whereby either of said driving means may be disposed in an operative or inoperative position.

A further object is to provide a hay press of the above mentioned character which is simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the several views:

Figure 1 is a top plan view of the hay press embodying my invention showing the same being actuated by horse power.

Figure 2 is a side elevation thereof,

Figure 3 is a rear end elevation showing the device operated by motive power in lieu of the horse power operating means, and Figure 4 is a detail showing the segmental pinion mounted on the adjacent ends of the divided driven shaft.

In the drawings wherein for the purpose of illustration is shown the preferred embodiment of my invention, the numeral 1 designates a supporting frame that is disposed horizontally, the same being secured on the intermediate and forward end inverted U-shaped brackets 2 and 3, respectively, the free ends of the arms of said brackets being disposed laterally for attachment to a suitable support. The rear end portion of the frame 1 is attached to an appropriate bracket 4, and this bracket includes a horizontally disposed intermediate portion 5 that extends longitudinally of the rear end portion of the frame between the sides thereof, the forward end portion of the bracket 4 being directed downwardly and secured to the crown portion of the intermediate U-shaped bracket 2 as shown at 6. A driven shaft 7 is journaled for rotation in a suitable bearing arranged on the crown portions of the supporting brackets 2 and 3 so that said shaft is arranged between the sides of the frame and is disposed longitudinally with respect thereto. A pulley wheel 8 is secured on the forward end of the shaft 7 whereby the same may be driven by motive power as by attaching a belt over the pulley 8 and connecting the other end of a belt to a pulley operated by a suitable motor, not shown, in the manner well known in the art. The shaft 7 is furthermore capable of being actuated by horse power if so desired. The manner in which said shaft is actuated by horse power will presently be described in detail.

Arranged for slidable movement between the parallel spaced guides 9 that extend transversely with respect to the forward end portion of the frame 1 is the rack bar 10 that has extending from the forward end thereof, the plunger rod or bar 11 on the forward end of which is secured the plunger or follower 12 that is employed for compressing the hay in the press box 13 in the manner well known in the art.

The rack bar is movable along a base plate 14 that is arranged between the cooperating guides 9 and the rear end of this base plate is directed upwardly, as at 15 for limiting the rearward sliding movement of the plunger rod and the rack bar associated therewith.

A retractile coil spring 16 is provided for normally maintaining the sliding plunger unit in its rearwardmost position, and as is clearly shown in Figure 1, one end of this coil spring is attached to the forwardmost part of the intermediate bracket 2, while the other end of said spring is attached to an angular ear 17 secured on the forward end portion of the plunger rod or bar 11.

Before going further it is deemed advisable to mention at this time that the shaft 7 is divided into complementary sections, the forward section being denoted by the reference character 18, while the rear section is denoted by the reference character 19. The shaft section 18 is journaled intermediate its ends in a suitable bearing arranged on the forward bracket 3 while the other section 19 is journaled at its intermediate portion in a similar bearing arranged on the top of the intermediate bracket 2. The adjacent ends of these sections are disposed in alinement with each other, but referring to Figure 4 it will be observed that the portion of the section 18 rearwardly of the bracket 3 is square and its extremity is round. The rounded inner end of the section 18 is referred to by the reference character 20. The section 19 has its rear end portion also of square formation, while the forward end of the section 19 is square as indicated at 21 for a purpose to be presently described.

Adapted for disposition upon the adjacent ends of the sections of the shaft 7 is the hub 23 that has associated therewith the segmental pinion 24 that is adapted to cooperate with the rack bar 10 carried by the rear end of the plunger rod or bar 11. The inner end portion of the hub 23 has its bore of rectangular shape to receive the square inner or forward end 21 of the section 19, while the outer end portion of the hub has its bore of circular formation for receiving the rounded inner end portion 20 of the section 18, as is clearly indicated in Figure 4. Furthermore, the outer end portion of the hub 23 provides a clutch portion 25 that cooperates with a sliding clutch collar 26 arranged on the squared portion of the section 18 for rotation therewith.

A lever 27 that is pivoted intermediate its ends on the forward end portion of the frame 1 as at 29 is formed at its inner end with a yoke 28 that cooperates with the sliding clutch collar 26 that actuates the same whereby said clutch collar may be moved into or out of engagement with the clutch 25.

The frame 1 is formed with a segmental toothed portion 30 that underlies the pivoted lever 27 and cooperating with this toothed segment is the spring pressed pawl 31 attached to the under side of the lever 27 and which pawl is controlled by an auxiliary lever 32. The pawl and segmental toothed portion cooperate to secure the clutch collar 26 either in an operative or inoperative position, and obviously when the clutch collar is in engagement with the clutch 25 in the manner as shown in Figure 3, the press is adapted to be operated by motive power, and the pulley 8 is then employed.

The means whereby the segmental pinion 24 may be actuated by horse power during the operation of the hay press includes a vertical shaft 33 that is journaled at its lower end in a suitable bearing, this shaft extending upwardly through the portion 5 of the rear bracket 4, and carried by the intermediate portion of this shaft for rotation therewith is the bevel gear 34. The upper end of the vertical shaft 33 is reduced, and is formed with the squared portion for permitting the attachment of a cross beam 35 thereon and this cross beam constitutes a tongue to which the horses may be attached in the usual manner so that the cross beam will cooperate with the squared upper end of the vertical shaft to rotate the same, and the beveled gear 34 carried thereby.

The reduced upper squared end of the vertical shaft 33 is denoted by the reference character 36, and in Figures 1 and 2, there is clearly illustrated the manner in which the inner end of the beam 35 is mounted on the upper end 36 of the vertical shaft.

Cooperating with the beveled gear 34 is the beveled pinion 37 that is formed with a square bore for slidable movement upon the squared inner end of the divided shaft 7, and a collar 38 is formed on one side of the beveled gear 37 for accommodating the yoke 39 on the inner end of a lever 40 that is pivoted on the frame 1 as at 41. A pawl and ratchet mechanism similar to that which is associated with the frame and the lever 27 is also provided for cooperation with the pivoted lever 40. The lever 40 cooperates with the sliding gear 37 whereby the latter may be moved into or out of engagement with the beveled gear 34, and when the device is to be operated by motive power, the parts are arranged as shown in Figure 3. However, when the hay press is operated by horse power, the parts are arranged as shown in Figure 1, and it will be observed that the pinion 37 meshes with the bevel gear 34, while the clutch collar 26 is disengaged from the clutch 25, and the squared inner end 21 of the section 19 will cooperate with the squared portion of the bore of the hub 23 to operate the segmental pinion 24.

The operation of my improved hay press is thought to be readily obvious from the construction disclosed, and it will be apparent that when either section of the divided shaft is operated, the segmental pinion 24 will cooperate with the rack bar 10 to move the plunger rod or bar 11 forwardly, and at the same time moving the plunger or follower 12 toward the forward end of the press box 13 to compress the hay placed therein. The spring 16 will return the parts to their normal positions so that a further compression stroke will be imparted to the plunger for effectively baling the hay in the press box.

It will thus be seen from the foregoing description that I have provided a hay press that will at all times be positive and efficient in its operation, and furthermore the driving mechanism therefor is so arranged as to permit the press to be operated either by motive power or by horse power, and the parts are so arranged as to facilitate the changing over from either horse power to motive power without any difficulty.

While I have shown the preferred embodiment of my invention it is to be understood that minor changes in the size, shape and arrangement of parts may be resorted to without departing from the spirit of the invention and the scope of the appended claim.

Having thus described the invention, what I claim as new and desire to secure by Letters Patent is:—

In a hay press having a press chamber and a plunger slidable therein, means for actuating the plunger comprising a rack bar connected to the plunger, a pair of alined shafts disposed transversely above the rack bar, one of said shafts being of polygonal cross-section and having an end portion of circular cross-section, the other of the shafts being of circular cross-section and having an end portion of polygonal cross-section in opposed relation to the circular end portion of the first named shaft, means for independently rotating said shafts, a segmental pinion supported on the polygonal end of the circular shaft and having a bore including a polygonal portion for the reception of the polygonal end of the circular shaft for causing the pinion to rotate therewith and a circular portion for receiving the circular end of the polygonal shaft for permitting independent rotation therebetween, a clutch element on the segmental pinion, a clutch element mounted for longitudinal sliding movement on the polygonal shaft for engagement with the first named clutch element for effecting the rotation of said pinion with said polygonal shaft when the operating means for the circular shaft is in inoperative position, said pinion cooperating with the rack bar to move the plunger carried thereby forwardly into the press chamber.

In testimony whereof I affix my signature.

GEORGE W. BOWMAN.